United States Patent [19]

Powell

[11] 4,134,113
[45] Jan. 9, 1979

[54] MONOPULSE MOTION COMPENSATION FOR A SYNTHETIC APERTURE RADAR

[75] Inventor: Norman F. Powell, Ilchester, Md.

[73] Assignee: Westinghouse Electric Corporation, Pittsburgh, Pa.

[21] Appl. No.: 788,208

[22] Filed: Apr. 18, 1977

[51] Int. Cl.² ............................................. G01S 9/52
[52] U.S. Cl. .............................. 343/5 CM; 343/16 M
[58] Field of Search ............... 343/5 CM, 16 M, 5 ST

[56] References Cited

U.S. PATENT DOCUMENTS

| | | | |
|---|---|---|---|
| 3,680,086 | 7/1972 | Valstar | 343/5 CM |
| 3,737,900 | 6/1973 | Uehrs, Jr. | 343/5 CM |
| 3,992,710 | 11/1976 | Gabriele et al. | 343/16 M |
| 4,034,370 | 7/1977 | Mims | 343/5 CM |

OTHER PUBLICATIONS

*IEEE Trans. on Aerospace and Nav. Electronics*, Mar. 1963, pp. 50–64, P. G. Smith, "Noll-Tracking Doppler-Navigation Radar,".
*IEEE Transactions on Aerospace and Electronic Systems*, vol. AES-11, No. 3, May 1975, pp. 338–348, J. C. Kirk, Jr., "Motion Compensation for Synthetic Aperture Radar".

*Primary Examiner*—Maynard R. Wilbur
*Assistant Examiner*—Lawrence Goodwin
*Attorney, Agent, or Firm*—H. W. Patterson

[57] ABSTRACT

A synthetic aperture radar in which radial motion compensation is provided by a monopulse null tracking loop which tracks the null position of a stabilized monopulse antenna, and in which tangential motion compensation is provided by a tangential velocity measurement loop which tracks the cross-over angle of the monopulse antenna pattern. Since the motion compensation for the synthetic aperture radar is made in relation to a stabilized monopulse antenna, the imaging process for the synthetic aperture radar may be controlled in response to the angular scan rate of the antenna.

16 Claims, 7 Drawing Figures

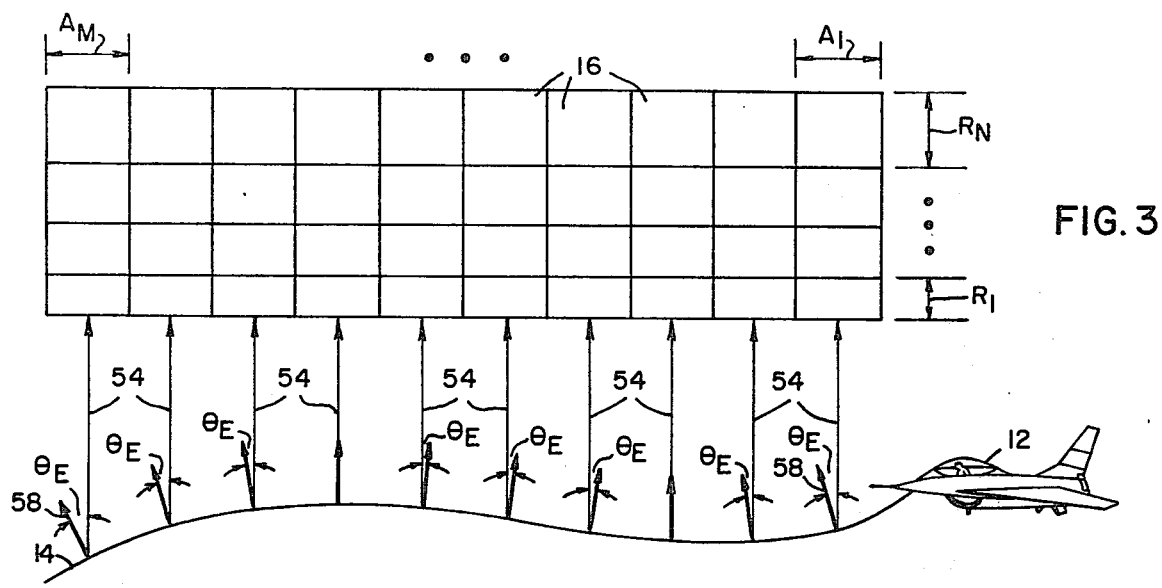
FIG. 3
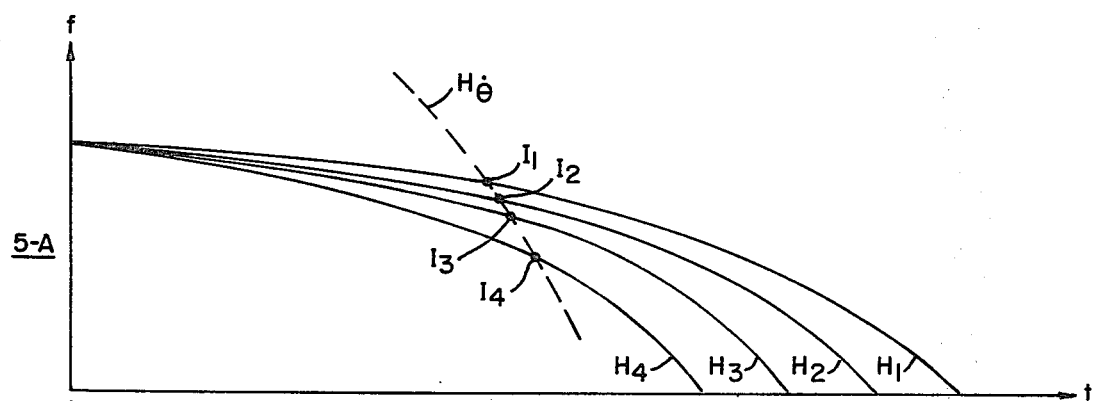
5-A
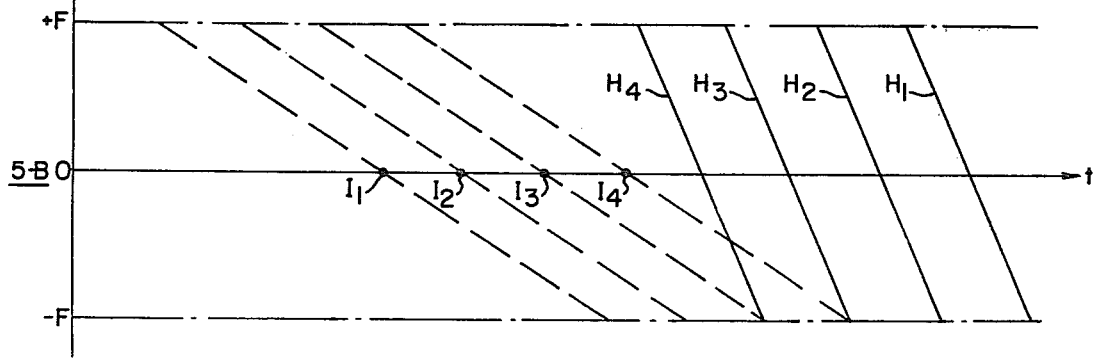
5-B
FIG. 5

MONOPULSE MOTION COMPENSATION FOR A SYNTHETIC APERTURE RADAR

BACKGROUND OF THE INVENTION

1. Field of the Invention

The present invention relates to synthetic aperture radars and, more particularly, to motion compensation for synthetic aperture radars.

2. Description of the Prior Art

In the prior art, there has been a continuing effort to develop radar systems which are suitable for high resolution application such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range-resolution of the conventional radar systems, but fine angular resolution by the radiation of a narrow beam still required a large diameter antenna which was impractical to transport with any significant degree of mobility. Subsequent to the development of pulse compression techniques, synthetic aperture radar techniques were developed for improving the angular resolution of a radar system to a value significantly finer than that directly achievable with a radiated beamwidth from a conventional antenna of comparable diameter.

In the prior art, an equivalent to a large diameter antenna was established which was comprised of a physically long array of antennas, each having a relatively small diameter. In the case of a long antenna array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of the single element radiation pattern and the array factor resulted in an effective antenna pattern having significantly sharper antenna pattern lobes than the antenna pattern of the single element.

Synthetic aperture radar systems are based upon the synthesis of an effectively long antenna array by signal processing means rather than by the use of a physically long antenna array. With a synthetic aperture radar, it is possible to generate a synthetic antenna many times longer than any physically large antenna that could be conveniently transported so that for an antenna of given physical dimensions, the resultant antenna beamwidth of the synthetic aperture radar is many times narrower than the beamwidth which is attainable with a conventioal radar. Due to their synthesis of an antenna length, or aperture, which is much greater than the actual aperture of the physical antenna, radars using this technique have been characterized as synthetic aperture radars. In the most common synthetic antenna case, a single radiating element is used which is translated to take up sequential sampling positions along a line. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array antenna. More precisely, greater resolution is obtainable for a synthetic aperture radar than for a conventional linear array of equivalent length as a consequence of the non-coherent transmission of the illumination from the sampling points of the synthetic aperture radar. The signals in storage are subjected to a corresponding operation to that used in forming the effective antenna pattern of a physical linear array, that is they are added vectorially, so that the resulting output of the synthetic aperture radar is substantially the same as could be achieved with the use of a physically long, linear antenna array.

In generating the synthetic antenna, the synthetic aperture radar signal processing equipment operates on a basic assumption that, as an equivalent to an actual linear array, the radar platform traverses a straight line at a constant speed. In practice, a vehicle carrying the radar antenna is subject to deviations from such non-accelerated flight and it is therefore necessary to provide compensation for these perturbations in straight-line motion. This motion compensation must be capable of detecting the deviation of the radar platform path from a true linear path. In prior art synthetic aperture radars carried aboard aircraft, the flight path perturbations of the aircraft have been detected by an inertial navigation system from which processing equipment aboard the aircraft has computed the deviations from the assumed linear path. However, the complexity and sensitivity of the inertial navigation system and its associated processing equipment has made such motion compensation equipment expensive to build and difficult to maintain. Moreover, many aircraft are not otherwise equipped with inertial navigation systems and, therefore, the inertial navigation system would have to be specially added if a synthetic aperture radar were to be employed aboard the aircraft. Therefore, there was a need for a synthetic aperture radar motion compensation system which could avoid the use of an inertial navigation system thereby affording a relatively inexpensive motion compensation system and permitting the use of synthetic aperture radar aboard aircraft not otherwise equipped with inertial navigation systems.

SUMMARY OF THE INVENTION

In accordance with the present invention, a monopulse motion compensation system is provided for a synthetic aperture radar. A stabilized monopulse antenna transmits a monopulse antenna pattern and receives return echoes which are then provided to an offset generator which compensates for radial deviations of the radar platform from a straight line path. The output of the offset generator is provided to a prefilter which limits the quantity of information processed by the synthetic aperture radar correlation apparatus before imaging of the return echoes of the antenna pattern. A monopulse null tracker is responsive to the prefilter and tracks the position of the antenna pattern null to control the radial compensation of the offset generator. A tangential velocity signal generator, which is also responsive to the output of the offset generator, determines the doppler shift in the received signals at the cross-over angle in the monopulse antenna pattern to determine the tangential velocity of the radar platform. Sine the radial motion compensation occurs in relation to the antenna pattern null, the synthetic aperture radar focusing apparatus then focuses the signals of the correlation apparatus for imaging in response to the tangential velocity of the tangential velocity signal generator and the angle scan rate of the monopulse antennna.

BRIEF DESCRIPTION OF THE DRAWINGS

FIG. 3 illustrates a typical non-linear vehicle flight path in relation to the direction of the antenna null of a stabilized monopulse antenna.

FIG. 5 illustrates the frequency modulation slope of the echo signals as affected by the angular scanning of the monopulse antenna.

DESCRIPTION OF THE PREFERRED EMBODIMENT

Figure 1:
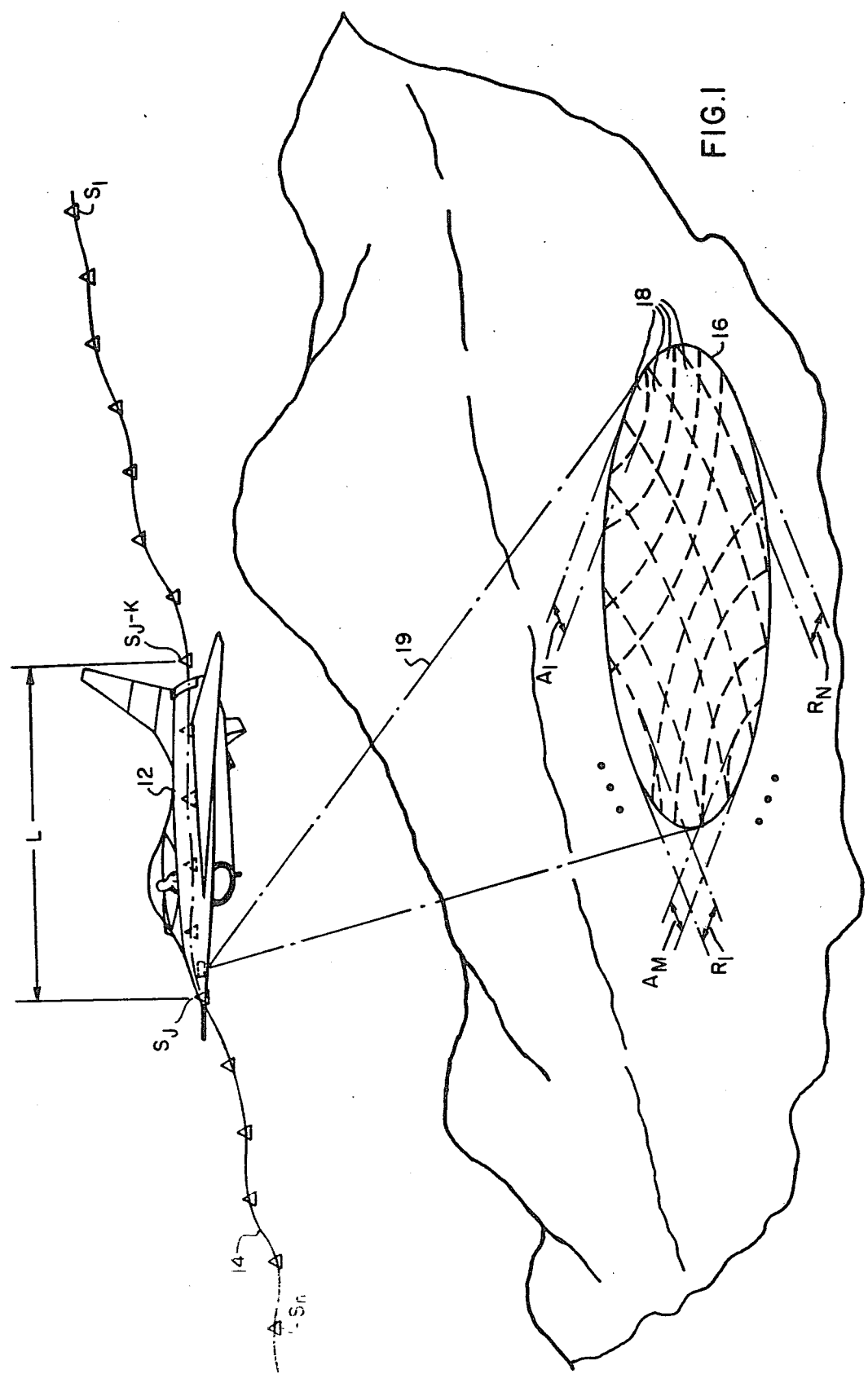
FIG. 1 illustrates a typical application of the disclosed monopulse motion compensation for a synthetic aperture radar.

FIG. 1 illustrates the application of a synthetic aperture radar system (hereafter sometimes referred to as a SAR system) in a typical strip-line ground mapping operation. The synthetic aperture radar is carried aboard an aircraft 12 which is traversing a flight path 14 that is substantially parallel to the strip of ground 16 which is being mapped. It will be noted, however, that the flight path 14 is not strictly linear but that, as a result of perturbations of the aircraft 12, it contains certain contours which have been exaggerated in FIG. 1 for the purposes of illustration. The map strip 16 is comprised of M number of parallel columns of resolution cells 18 which resolution cells are also arranged in N number of parallel rows located at various ranges from the aircraft 12. That is, each parallel column of resolution cells 18 is further comprised of N number of resolution cells 18 so that the strip of ground 16 which is being mapped is defined by N × M number of resolution cells 18 whose range dimensions are indicated as $R_1$ through $R_N$ and whose azimuth dimensions are indicated as $A_1$ through $A_M$. To obtain a high resolution and, therefore, a more accurate representation of the ground strip 16 which is being mapped, the resolution cells 18 should be as small as possible. The reduction of the range dimension (R) of the resolution cells 18 is accomplished by pulse compression techniques which are not particularly unique to synthetic aperture radars and, since they are unnecessary to an understanding of the present invention, are not hereafter referred to. Higher angular resolution, that is, the limitation of the azimuth dimension (A) of the resolution cells 18, is the object of a typical SAR system and will be hereafter more fully described in relation to FIG. 2.

In accordance with the typical operation of a SAR system as illustrated in FIG. 1, the synthetic aperture radar set aboard the aircraft 12 includes a conventional antenna (shown in FIG. 2) of relatively small physical dimensions. As the aircraft 12 moves along the flight path 14, the antenna is translated to take up sequential sampling point positions $S_1$ through $S_n$ parallel to the map strip 16. When the synthetic aperture radar antenna is at sampling point $S_1$, the radar transmits a pulse. The transmit pulse causes the radar antenna to propagate an antenna pattern similar to that illustrated in FIG. 1 as being bounded by the dashed lines 19. Thereafter, the antenna receives an echo of the transmitted signal and the amplitude and phase of this signal are preserved in a memory device. Likewise, when the radar antenna is at sampling point $S_2$, the radar transmits a second pulse and receives a second reflected echo signal which is also stored in the memory device. This process continues until the motion of the aircraft has carried the radar antenna through a predetermined number of sampling points which are sufficient to compose a synthetic aperture of sufficient length to achieve the desired resolution. In FIG. 1, the synthetic aperture L is illustrated as being K sampling points in length. As previously explained, after the antenna has traversed K sampling points, the signals stored in the memory device are somewhat similar to the signals that would have been received by the elements of a conventional linear array antenna arranged along the flight path 14 of the aircraft 12. That is, the translation of the radar antenna along the flight path 14 and the transmission of radar pulses at sampling points $S_1$ through $S_n$ along the flight path is somewhat analogous to placing a sequence of radiating elements at the sampling points along the flight path 14. The vectorial combination of return echoes from the transmitted pulses by the integration of the echo returns from K number of adjacent sampling points over the time period necessary for the radar antenna to traverse the K number of sampling points will cause effective cancellation between echoes having a sufficiently different phase. As well known in the art, the resultant combination of echoes provides an effective antenna pattern having angular resolution comparable to that obtainable from a linear array radar antenna having a physical length substantially equal to twice the distance traversed by the aircraft 12 over the integration period. In the illustration of FIG. 1, K number of the stored echo returns are vectorially combined by integrating these returns over the time required by the aircraft 12 to traverse the synthetic aperture comprised of K sampling points to provide angular resolution illustrated by the resolution cells 18.

As can be seen from the vehicle flight path 14 shown in FIG. 1 and further illustrated in FIG. 3, inflight perturbations of the aircraft 12 create contours in the vehicle flight path 14 which vary the range of the SAR platform in relation to the map strip 16 and which consequently vary the velocity of the SAR platform relative to the azimuth dimension A of the columns of resolution cells 18 comprising map strip 16. Such changes in the range between the SAR platform and the map strip 16 create a velocity between the SAR platform and the map strip 16 which is hereafter referred to as the radial velocity. The variations in the radial velocity for a SAR platform whose absolute velocity is constant also creates variations in the velocity of the SAR platform along the azimuth dimension A of the columns of resolution cells 18, which comprise the map strip 16, hereafter referred to as tangential velocity. The radial velocity between the SAR platform and the map strip 16 imposes a doppler frequency on the phase of the echo returns which are received and placed in storage by the SAR system. Since these stored signals are integrated to effect a cancellation of echos whose phase indicates that they are reflected from points off center of the radar beam, the superimposed doppler frequency will create errors in the integrated result. Furthermore, variations in the tangential velocity will distort the focusing of the SAR image as is subsequently described in relation to FIGS. 5 through 7. It is therefore the object of the disclosed method and system to compensate for the phase variations in the echo returns due to radial velocity of the vehicle 12 and to correct for focusing errors due to variations in the tangential velocity of the vehicle 12.

Figure 2:
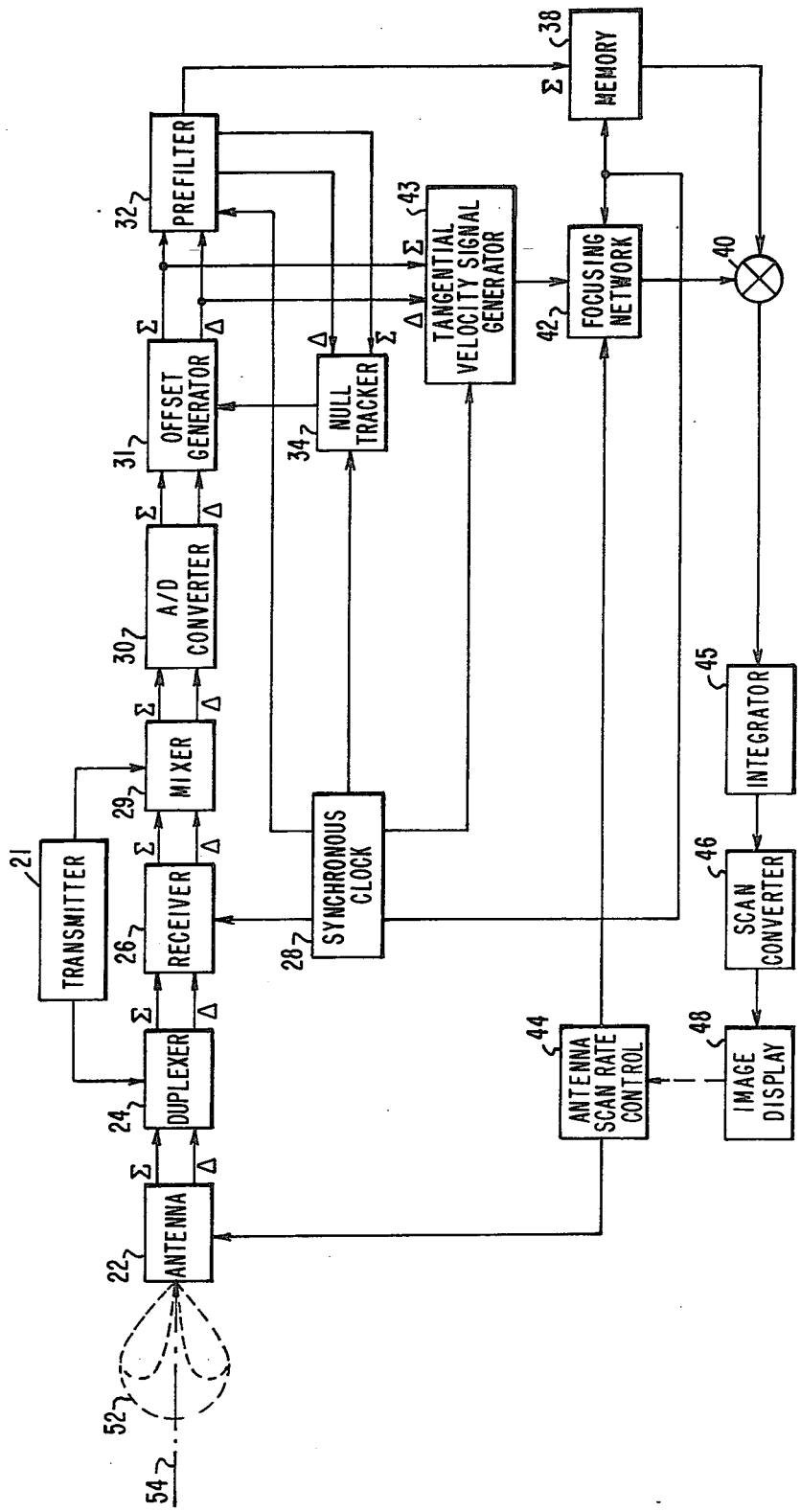
FIG. 2 is a block diagram of the preferred embodiment of the present invention.

FIG. 2 shows a block diagram of the synthetic monopulse radar which is carried aboard the vehicle 12 of FIG. 1 and illustrates the apparatus for practicing the disclosed method of motion compensation and SAR focusing. The synthetic monopulse radar of FIG. 2 includes a transmitter 21 which supplies an illumination signal pulse to a stabilized monopulse antenna 22 through a duplexer 24 to cause the stabilized monopulse antenna 22 to propagate microwave energy toward the map strip 16 (FIG. 1). The stabilized monopulse antenna 22 also collects return echoes of the propagated transmission signal and operates through the duplexer 24 to provide the return signal to a receiver 26. The receiver 26 samples the return signal of the antenna 22 in response to a timing signal from a synchronous clock 28 and provides these sampled signals to a mixer 29 which is also responsive to the transmitter 21. The mixer 29 operates to provide intermediate frequency signals (hereafter sometimes referred to as IF signals) to an analog-to-digital converter 30 (hereafter sometimes referred to as A/D converter 30). The output of the A/D converter 30 is provided to an offset generator 31 which is comprised of a complex multiplier as hereafter more particularly described in relation to FIG. 4. A prefilter 32 is responsive to the output of the offset generator 31 while a null tracker 34 is responsive to the output of the prefilter 32 and, as explained more fully in relation to FIGS. 3 and 4, cooperates with the offset generator 31 and the prefilter 32 to provide radial motion compensation for the disclosed SAR radar system.

In response to the output of the offset generator 31, the prefilter 32 provides sampled output signals which are within a predetermined bandpass to a memory 38 in which the information is stored prior to further processing. In response to a timing signal from the synchronous clock 28, the information stored in the memory 38 is provided to a multiplier 40 which is also responsive to a focusing signal provided by a focusing network 42. The focusing network 42, which is responsive to a tangential velocity signal generator 43, an antenna scan rate control 44 and the synchronous clock 28, focuses the output of the memory 38 by multiplying the output of the memory 38 in the multiplier 40 to adjust the slope of the time-bandwidth product signal. The multiplier 40 provides this focused output to an integrator 45 which integrates the focused information stored in the memory 38. The integrator 45 provides the correlated output of the memory 38 to a scan converter 46 which arranges the order in which the correlated output of the memory 38 appears to make the correlated information compatible with conventional image displays. An image display 48 is responsive to the output of the scan converter 46 and a human operator controls the antenna scan rate control 44 in response to the images which appear on the image display 48. The antenna scan rate control 44 controls the position of the stabilized antenna 22 with respect to the reference frame of the aircraft 12.

In the operation of the preferred embodiment of FIG. 2, the rate stabilized monopulse antenna 22 transmits a monopulse antenna pattern 52 in response to the excitation of the transmitter 21. The echo returns of the antenna pattern are collected by the monopulse antenna 22, sum and difference antenna patterns are synthesized by the antenna, and the sum ($\Sigma$) and difference ($\Delta$) signals are detected by the receiver 26. The sum and difference signals detected by the receiver 26 are downconverted to representative IF sum ($\Sigma$) and difference ($\Delta$) signals in the mixer 29 by mixing the sum and difference signals of the receiver 26 with the transmit signal of the transmitter 21. The IF sum and difference signals are then converted from analog to digital form in the analog-to-digital converter 30 and the digitized IF sum and difference signals are then provided to the offset generator 31.

The A/D converter 30 operates at a rate commensurate with the bandwidth of the SAR system, and resolves detected echo returns into individual range cells; the range dimension (R) of the range cells is approximately the range resolution of the system. The offset generator 31 provides a phase shift in the sum and difference input signals in response to the output of the null tracker 34 to compensate for the radial motion of the SAR platform relative to the map strip 16 as further explained in relation to FIGS. 3 and 4. More particularly, the offset generator 31 performs a complex multiplication on the sum and difference input signals to remove the doppler frequency introduced in the sum and difference input signals as a consequence of the radial velocity of the SAR platform. The compensated sum and difference signals are then provided to the prefilter 32 which has a predetermined frequency bandwidth.

A prefilter is utilized in cases where the real antenna beamwidth is greater than the minimum beamwidth required to achieve a synthetic array length commensurate with the resolution requirement of the radar system. The prefilter operates to exclude those signals having a doppler frequency that corresponds to returns reflected from outside the minimum beamwidth. By selecting the input information within this bandwidth for subsequent focusing and imaging by the SAR system, and by rejecting the input information occurring at frequencies ouside its bandwidth, the prefilter 32 limits the information storage requirements of the SAR system thereby reducing the system's cost and complexity. Additionally, the pulse repetition frequency of the radar may be higher than the minimum frequency required to avoid doppler ambiguity in the echo returns. The redundant information produced by this oversampling of the radar is also eliminated by the prefilter 32, thereby further reducing the data capability requirement for the subsequent SAR signal processing apparatus. That is, in addition to rejecting input signals at frequencies outside its predetermined bandwidth, the prefilter 32 performs an integrating function to average the input information at frequencies within its bandwidth to further reduce the information storage requirement of the SAR system. More specifically, due to the relatively high pulse repetition frequency (PRF) of the SAR radar, the IF return signals provided by the offset generator 31 contain more information data than is necessary to produce the achievable azimuth resolution as it is limited by the bandwidth of the SAR system. Since the memory 38 need not store all the information content of the IF echo signals provided by the offset generator 31, the prefilter 32 stores the information content of the echo signals of the offset generator 31 for predetermined time intervals after which the information is sampled by the synchronous clock 28. The sampling frequency of the prefilter 32 by the synchronous clock 28 is such that the information provided to the memory 38 is more nearly commensurate with the achievable angular resolution of the SAR system. The prefilter 32 thereby avoids excessive capacity in the memory 38 by reducing the required capacity of the memory 38 by a factor substantially equal to the sampling frequency of the prefilter 32. Such prefilters are well known in the radar art, one of which is more particularly described in FIG. 4.

Figure 4:
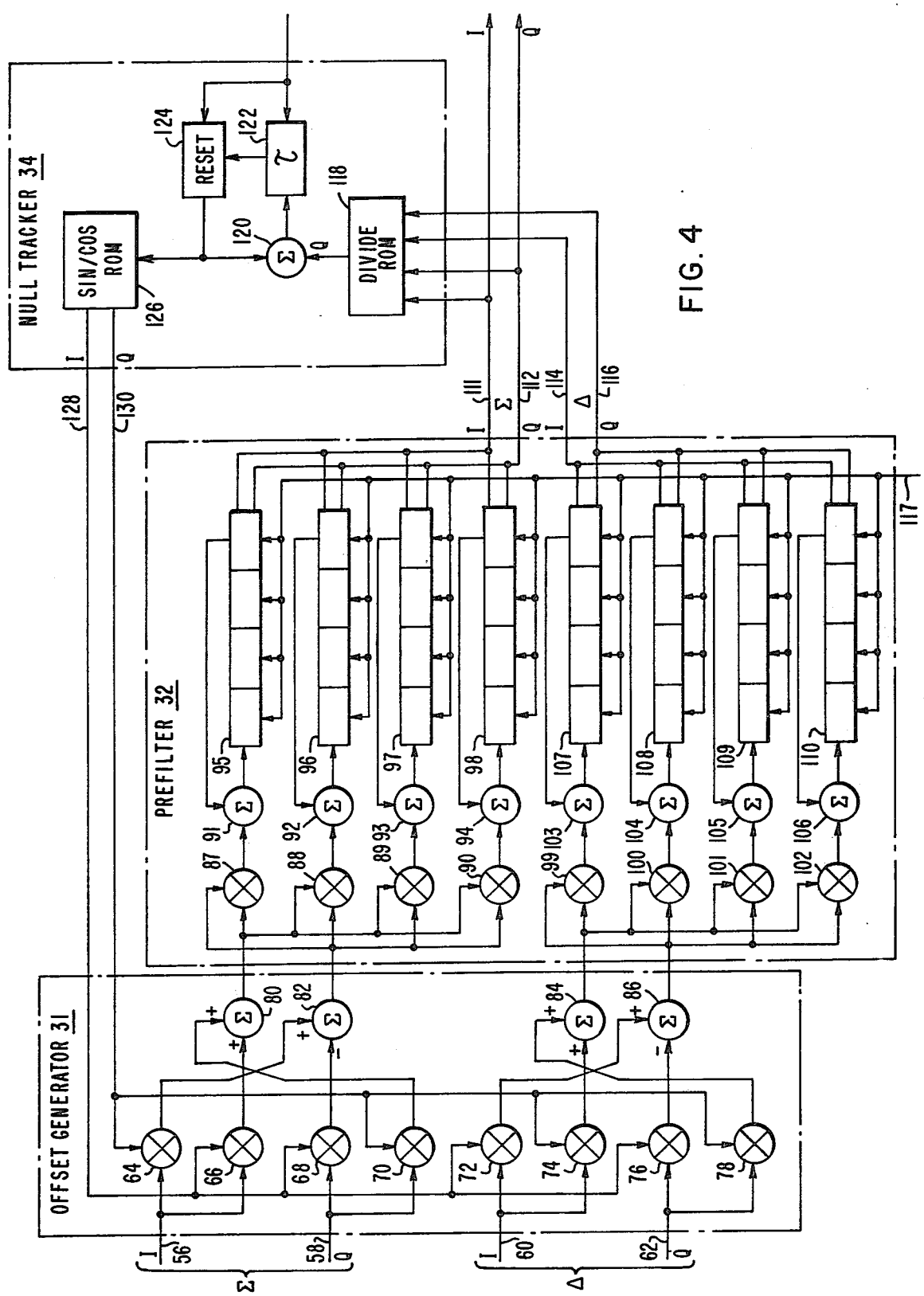
FIG. 4 is a detailed block diagram of the offset generator, null tracker and prefilter which are shown in FIG. 2.

As more particularly described in relation to FIGS. 3 and 4, the null tracker 34 tracks the null position 54 of the antenna pattern 52 by dividing the prefilter difference input signal by the prefilter sum input signal, averaging this quotient over the integration period of the prefilter 32, and converting the averaged quotient of the prefilter difference and sum signals into a coordinate form suitable for controlling the phase offset provided by the offset generator 31. As will be further explained hereinafter in relation to Equations 5, 6 and 7, a direct result of compensating the radial motion by relation to the null position 54 of the antenna 22 is that the resolution achievable with the system is directly related to the scan rate of the antenna, and, therefore, the antenna angular scan rate can be used to control this resolution.

The memory 38 stores the sampled output signals of the prefilter 32 which are provided while the aircraft 12 traverses K sampling points which distance, as illustrated in FIG. 1, is equivalent to the length (L) of the synthetic aperture. Since the phase and amplitude of each echo signal must be preserved, two pieces of data must be recorded for each range cell of each sampling point $S_J$ through $S_{J-K}$. Thus, a three dimentional matrix of information words is acquired in the memory 38. The successive entries in a dimension of the memory 38 which may arbitrarily be defined to be the X dimension are range words, since the detected echoes of each sampling point are sorted into range cells by the A/D converter 30. The successive entries in a dimension perpendicular to the X dimension and which is defined to be the Y dimension cooperate to represent the amplitude of the range word for each X coordinate. The successive entries in a Z dimension which is perpendicular to the plane formed by the X and Y dimensions represents the azimuth position of the sampling points within the synthetic aperture. Once the information of the prefilter 32 is stored in the memory 38 it is correlated to provide an image of high resolution. The correlation of the stored information to provide a high resolution image includes integration by the integrator 45 and focusing by the multiplier 40.

As explained for the physical example of FIG. 1, the difference in doppler frequency with respect to azimuth position provides the basis for target azimuth resolution.

The integrator 45, which is comprised of a low pass filter, integrates the information stored at the range, amplitude, and azimuth addresses of the memory 38 to form one azimuth line of the image. More particularly, to form an element of the image at a particular range location and the central azimuth location of the memory 38, the information contained in the memory 38 for all the azimuth and amplitude locations at the particular range is integrated in the integrator 45. Therefore, in the azimuth dimension, half the integrated information precedes the location of the image element and half the integrated information follows the image element location. To form another element of the image at the central azimuth location of the memory 38 but at a different range location, the information contained in the memory 38 for all the azimuth and amplitude locations at the new range location is integrated. When the integration of all the azimuth and amplitude locations is completed for each range location, all the image elements at the central azimuth location have been formed and the central azimuth line of the image is complete. When the integration of an azimuth line of the image is completed, the information which is the oldest information in the memory 38 is discarded and new information provided by the sampled output of the prefilter 32 is entered. In the physical example of FIG. 1, the old information being discarded from the memory 38 represents the echo returns from the sampling point $S_{J-K}$ which is moving out of the synthetic aperture as the aircraft 12 traverses the flight path 14, and the new information which is being entered into the memory 38 represents the echo returns from the sampling point $S_{J+1}$ which is moving into the synthetic aperture. In accordance with the above-described operation of the SAR system, the memory 38 is filled along its range dimension for each azimuth dimension location, but the memory 38 provides an output along its azimuth dimension for each range location. Therefore, the memory 38 is a corner-turn memory which is familiar to those skilled in the art.

Prior to the integration of the information in the memory 38 to form an image line, the information is focused by multiplying it by the output of the focusing network 42 in the multiplier 40. As is further explained in relation to Equation 11 and FIGS. 5 and 7, the integration of the doppler frequency time history describes the phase shift that must be applied over the coherent integration time of the integrator 45 to focus the image of the synthetic aperture. Unlike prior art systems in which computations on data provided by inertial navigation systems were used to determine the matched phase history or phase shift required to focus the returns from a reflector at any given azimuth position, the disclosed SAR system provides a focusing signal from the focusing network 42 which, as more particularly explained in relation to FIGS. 5 and 7, is responsive to the angular scan rate of the antenna scan rate control 44, the tangential velocity of the tangential velocity signal generator 43, the wavelength of the antenna signal 52, and the range cell in the memory 38 which is addressed by the synchronous clock 28.

As shown in FIG. 2, correlation, which is accomplished by the multiplication of the information of the memory 38 by a focusing signal of the focusing network 42 in the multiplier 40 over a narrow doppler frequency band established by the bandwidth of the integrator 45, is employed for resolving the image elements from the memory information which represents the doppler frequency of the azimuth positions of the synthetic aperture. The correlation process, therefore, involves the generation of a reference signal whose phase shift matches the phase change of the information over the integration period of the integrator 45 for the various ranges at each sampling point. That is, to achieve coherent integration of signals reflected at various ranges from a sampling point of the synthetic aperture, a phase adjustment must be made for focusing at each range to compensate for the change in doppler frequency with azimuth position.

Figure 6:
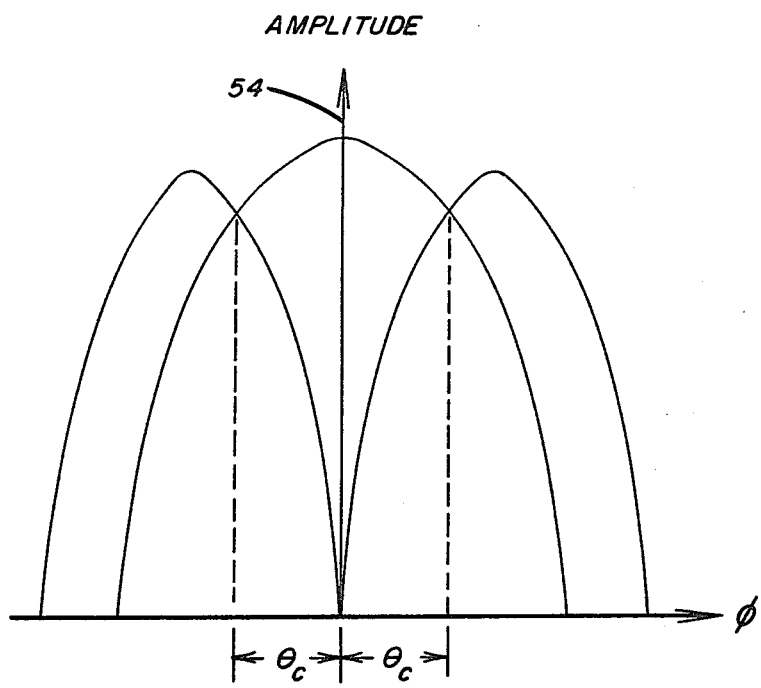
FIG. 6 illustrates the cross-over points of the amplitude of the monopulse antenna pattern displaced as a function of phase angle.
Figure 7:
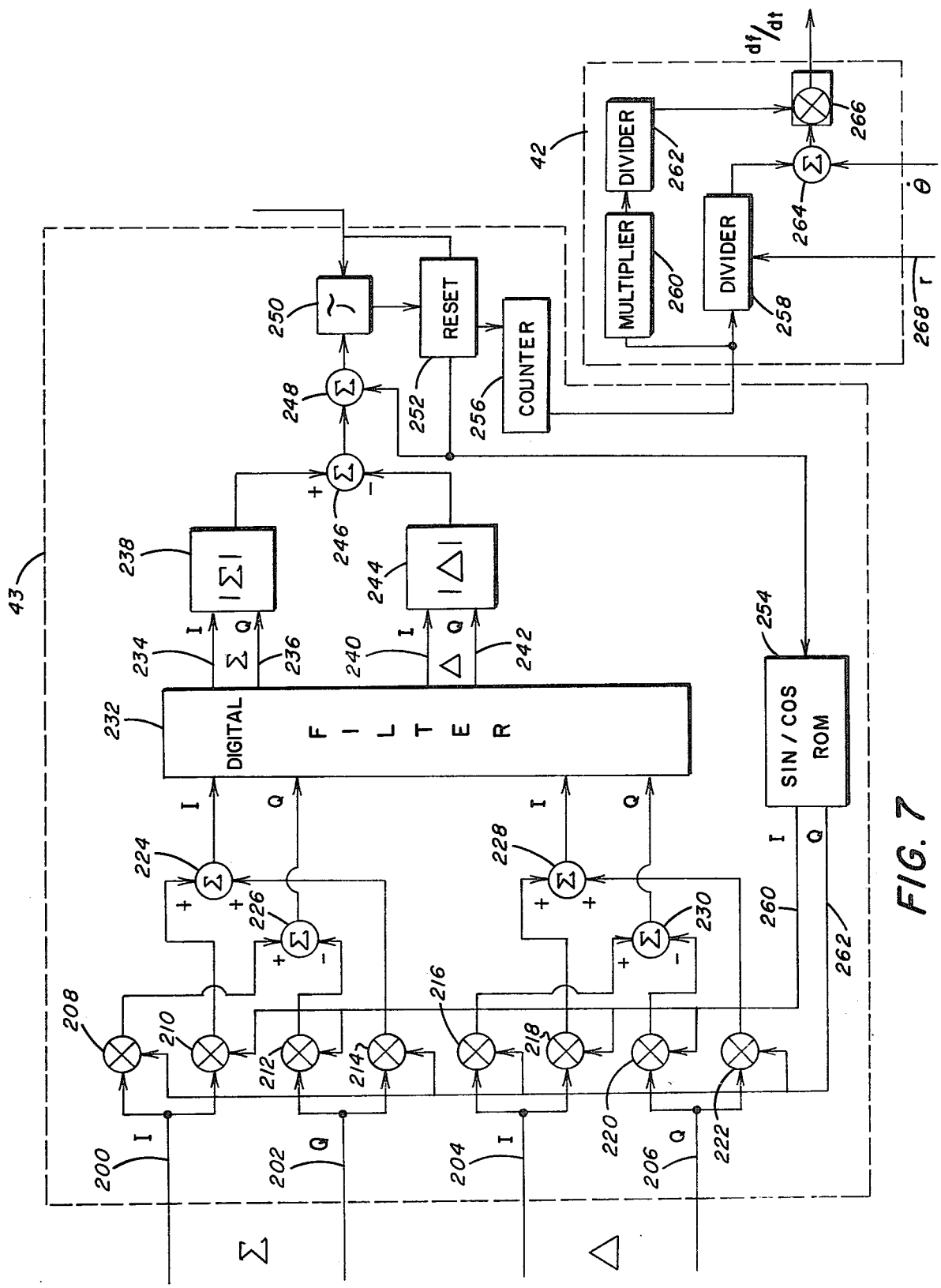
FIG. 7 is a more detailed block diagram of the tangential velocity signal generator and focusing network shown in FIG. 2.

As further explained in relation to FIGS. 5, 6 and 7, the focusing network 42, which is responsive to the tangential velocity signal generator 43, the antenna scan rate control 44, and the synchronous clock 18, focuses the output of the memory 38 in relation to the range, radio frequency wavelength, tangential velocity and antenna angular scan rate. The range is fixed by the geometric relation of the SAR platform to the map strip 16 and the wavelength is determined by the radio frequency of microwave energy which is propagated by the SAR system, while the antenna angular scan rate is independently controlled in response to the antenna scan rate control 44. In the example of the embodiment of FIG. 2, control of the angular scan rate is accomplished through a human operator who controls the antenna scan rate control 44 in response to the image of the image display 48. As is more fully explained in relation to FIGS. 5, 6 and 7, the tangential velocity signal generator 43 employs doppler tracking filters whose bandwidth is centered at the cross-over points of the monopulse antenna pattern such that the center to cross-over doppler offset is measured to determine the tangential velocity. The image display 48 produces an image in response to the output of the scan converter 46 which converts the output of the integrator 45 into a form suitable for utilization with the image display 48.

As each range cell of the sampling points represented by the information stored in the memory 38 is integrated by the integrator 45 to form an image element at a range location on the central azimuth image line, the image element is stored in the scan converter 46. In accordance with the previously described operation of the memory 38 and the integrator 45, the image elements are successively stored for each range coordinate of a particular azimuth line of elements before the image elements which form the next azimuth line are composed by the correlation of the information stored in the memory 38. However, the image display 46, which is composed of a television display, produces an image by controlling the intensity of an electron beam which scans a fluorescent screen in the azimuth direction. Therefore, the scan converter 46 is also comprised of a corner turn memory that makes the correlated output of the integrator 45 compatible with the image display 48.

The disclosed invention compensates for non-linear radial motion of a synthetic aperture radar by using the video signals of a rate stabilized, monopulse antenna to derive radial components of motion and employing this radial motion component to modify the phase of input data as illustrated in FIG. 3. FIG. 3 is a view taken along a direction normal to the plane of the map 16 of FIG. 1 and, in accordance with the above described strip mapping mode of operation, shows an aircraft 12 which carries the synthetic aperture radar (SAR) system, traversing a flight path 14 which is substantially parallel to the map strip 16. As was described in relation to FIG. 2, the SAR system includes a rate stabilized monopulse antenna 22 which will maintain a constant line of sight (LOS) direction with regard to the map strip 16 despite the perturbations of the aircraft 12 which is indicated in FIG. 3 by the directional lines 54 which represent the null position of the antenna pattern. In accordance with the previously described beam narrowing and integrating operation of the prefilter 32, the output of the prefilter 32 in response to the sampling signal of the synchronous clock 28 can be considered to be a synthetic beam segment. As also shown in FIG. 3, the vectors 58 illustrate the direction of the synthetic beam segments generated by the prefilter 32 (FIG. 2) for each sampling by the synchronous clock 28. It will be noted from FIG. 3 that a pointing error in the directional vector 58 of the synthetic beam segments generated by the prefilter 32 for any sampling is directly proportional to the radial velocity between the SAR platform and the map strip 16, and that when the radial velocity is zero, the pointing error of the directional vector 58 is also zero. Specifically, the relation between the direction of the stabilized antenna 22 and the directional vector 58 of the synthetic beam segments of the prefilter may be expressed as $$V_r = V_o \sin\theta = V_o E_p \qquad (1)$$

where $V_r$ is the radial velocity between the SAR platform and the map strip 16, $V_o$ is the absolute velocity of the aircraft 12 in free space, $\theta$ is the angle between the direction of the antenna pattern null 54 of the stabilized antenna 22 and the directional vector 58 for the synthetic beam segment, and $E_p$ is the pointing error of the synthetic beam of the prefilter 32. Therefore, by using the null position of the rate stabilized antenna 22 as an inertial reference, the synthetic beam segment of the prefilter may be utilized to provide clutter referenced motion compensation for radial motion of the SAR system.

Since the phase error of the signal returns is a consequence of the radial velocity between the aircraft 12 and the map strip 16, and since the radial velocity may be measured in relation to $E_p$, the pointing error associated with a synthetic beam segment generated by the prefilter 32 based on the null direction 54 of the rate stabilized monopulse antenna 22, corrections for variations in the phase of the echo signal returns may be made by measuring the pointing error $E_p$ and offsetting the phase of the sum and difference signals provided to the prefilter 32 in proportion to the measured pointing error $E_p$. Consequently, a requirement of accurate measurement of the pointing errors $E_p$ of the synthetic beam segment is basic to the disclosed monopulse motion compensation system. The accuracy of pointing error measurements is improved by averaging the independently determined pointing error of each different range of the synthetic beam segment. That is, the accuracy of pointing error measurements is improved by determining the pointing error associated with each range of the information forming the synthetic beam segment data and then combining the pointing error of a large number of ranges into an averaged beam pointing error measurement.

FIG. 4 shows a more detailed block diagram of the offset generator 31, the prefilter 32, and null tracker 34 of FIG. 2 which cooperate to provide radial motion compensation for the SAR. In the more detailed drawing of FIG. 4, the sum (Σ) signal provided by the A/D converter 30 is shown to include an in-phase component (I) and a quadrature component (Q) on lines 56 and 58 respectively. Likewise the difference (Δ) signal provided by the A/D converter 30 is shown to include an in-phase component (I) and a quadrature component (Q) on lines 60 and 62 respectively. The sum and difference signals include in-phase and quadrature components to permit the complex multiplication of the sum and difference signal in the offset generator 31. In general, the reference phase of the null tracker 34 can be different from the phase of the A/D converter 30 by a constant amount, and, therefore, in-phase and quadrature processing is implemented to eliminate a possible signal loss associated with an unknown phase. The offset generator 31 includes mixers 64 and 66 which are responsive to the in-phase component of the sum signal; mixers 68 and 70 which are responsive to the quadrature component of the sum signal; mixers 72 and 74 which are responsive to the in-phase component of the difference signal; and mixers 76 and 78 which are responsive to the quadrature component of the difference signal. The offset generator further includes an adder 80 responsive to the mixing products of the mixers 66 and 68; an adder 82 responsive to the mixing products of the mixers 64 and 68; an adder 84 responsive to the mixing products of the mixers 74 and 78; and an adder 86 responsive to the mixing products of the mixers 72 and 76. The adders 80 and 82 respectively provide the in-phase and quadrature components of the sum signal to the prefilter 32, and the adders 84 and 86 respectively provide the in-phase and quadrature components of the difference signal to the prefilter 32.

The prefilter 32 is comprised of a digital filter such as is well known in the radar art and operates to form the synthetic beam segments which are stored in the memory 38 (FIG. 2) after which they are focused and correlated to form the image of the map strip 16 as was explained previously. The in-phase and quadrature components of the sum signal of the synthetic beam segments are provided on lines 110 and 112 respectively and the in-phase and quadrature components of the difference signal of the synthetic beam segments are provided on lines 114 and 116 respectively.

As also shown in FIG. 4, the null tracker 34 includes a divide read-only-memory 118 (hereafter sometimes referred to as divide ROM 118), an adder 120, a delay line 122, a reset counter 124, and a sin/cos read-only-memory 126 (hereafter sometimes referred to as sin/cos ROM 126).

The offset generator 31 provides in-phase and quadrature phase correction signals for the sum signal on lines 128 and 130 respectively. In the operation of the offset generator 31, prefilter 32 and null tracker 34 to provide radial motion compensation for the disclosed SAR system, the in-phase and quadrature components of the sum signal are provided to the offset generator 31 on the lines 56 and 58 and the in-phase and quadrature components of the difference signal are provided to the offset generator 31 on the lines 60 to 62 from the A/D converter 30 (FIG. 2).

It will be seen that the mixers 64, 66, 68 and 70 and the adders 80 and 82 cooperate to provide in-phase and quadrature components of the sum signal and the phase correction signal for the scan signal. More specifically, the mixer 64 is responsive to the in-phase sum signal on line 56 and the quadrature phase correction signal on line 130; the mixer 66 is responsive to the in-phase sum signal on line 56 and the in-phase phase correction signal on line 128; the mixer 68 is responsive to the quadrature sum signal on line 58 and the in-phase correction signal on line 128; and the mixer 70 is responsive to the quadrature sum signal on line 58 and the quadrature phase correction signal on line 130. The mixing products of the mixer 66 and the mixer 70 are added in the adder 80 to provide the in-phase component of the complex product of the in-phase and quadrature components of the sum signal and the in-phase and quadrature components of the phase correction signal for the sum signal. Similarly, the mixing products of the mixer 68 are subtracted from the mixing products of the mixer 64 in the adder 82 to provide the quadrature component of the complex product of the in-phase and quadrature components of the sum signal and the in-phase and quadrature components of the phase correction signal for the sum signal.

In a manner analogous to that described for the mixers 64, 66, 68 and 70 and the adders 80 and 82, the mixers 72, 74, 76 and 78 and the adders 84 and 86 cooperate to provide the in-phase and quadrature components of the complex product of the difference signal and the phase correction signal for the difference signal. More specifically, the mixer 72 is responsive to the in-phase difference signal on line 60 and the quadrature phase correction signal on line 134; the mixer 74 is responsive to the in-phase difference signal on line 60 and the in-phase phase correction signal on line 132, the mixer 76 is responsive to the quadrature difference signal on line 62 and the in-phase phase correction signal on line 132; and the mixer 78 is responsive to the quadrature phase correction signal on line 134. The mixing products of the mixer 74 and the mixer 78 are added in the adder 84 to provide the in-phase component of the complex product of the in-phase and quadrature components of the difference signal and the in-phase and quadrature components of the phase correction signal for the difference signal. Similarly, the mixing products of the mixer 76 are subtracted from the mixing products of the mixer 72 in the adder 86 to provide the quadrature component of the complex product of the in-phase and quadrature components of the difference signal and the in-phase and quadrature components of the phase correction signal for the difference signal.

The phase corrected, in-phase and quadrature components of the sum and difference signals are provided by the offset generator 31 to the prefilter 32 which is sampled at a rate such that the echo data provided to the memory 38 (FIG. 2) is more nearly matched to the azimuth resolution of the SAR system. A typical prefilter is such as the one referred to in "Digital Synthetic Aperture Radar Technology" by John C. Kirk, pp. 482–487 of *IEEE* 1975 *International Radar Conference* which has been published by IEEE Aerospace and Electronic Systems Society of The Institute of Electrical and Electronics Engineers, Inc., 345 East 47th Street, New York, N.Y. 10017. As is well known in the art, the capacity of the memory 28 can thereby be reduced by a factor which is equivalent to the ratio of the pulse repetition frequency of the transmitter 21 (FIG. 2) to the sampling rate of the prefilter 32. As mentioned previously, the prefilter 32 may be comprised of any suitable digital filter as is well known and understood by those skilled in the pertinent art. For the particular example of the preferred embodiment, the prefilter 32 includes multipliers 87, 88, 89 and 90 which are responsive to the in-phase and quadrature components of the sum signal provided by the adders 80 and 82 respectively. Adders 91, 92, 93 and 94 are responsive to the outputs of the multipliers 87, 88, 89 and 90 respectively and provide output signals to shift registers 95, 96, 97 and 98. The in-phase outputs of the shift registers 95, 96, 97 and 98 are combined to provide the in-phase component of the sum signal on line 111 and the quadrature output of the shift registers 95, 96, 97 and 98 is combined to provide the quadrature component of the sum signal on line 112. Furthermore, as shown in FIG. 4, the in-phase and quadrature outputs of each of the shift registers 95, 96, 97 and 98 are combined to provide a feedback signal to the adders 91, 92, 93 and 94 respectively. The prefilter 32 also includes multipliers 99, 100, 101 and 102 which are responsive to the in-phase and quadrature components of the difference signal provided by the adders 84 and 86 respectively. Adders 103, 104, 105 and 106 are responsive to the outputs of the multipliers 99, 100, 101 and 102 respectively and provide output signals to shift registers 107, 108, 109 and 110. The in-phase outputs of the shift registers 107, 108, 109 and 110 are combined to provide a feedback signal to the adders 103, 104, 105 and 106 respectively.

For a description of a typical operation of the prefilter 32, the sum signals of the offset generator 31 are provided to the multipliers 87, 88, 89 and 90, and the difference signals of the offset generator 31 are provided to the multipliers 99, 100, 101 and 102. In the multipliers 87 through 90 and 99 through 102, the sum and difference signals are multiplied by an amplitude term which is the synthetic array weighting function that controls the sidelobes of the synthetic antenna pattern. The weighting constant for each multiplier 87 through 90 is a different value such that each input data sample supplied to the multipliers 87 through 90 provides four outputs of different amplitude. In a similar manner, the weighting constant for each multiplier 99 through 102 corresponds to the weighting constant of the multipliers 87 through 90 respectively so that the weighting constants of the multipliers 99 through 102 are different with respect to each other and the multipliers 99 through 102 provide four outputs of different amplitude in response to each input data sample. The product output signals of the multipliers 87 through 90 are provided to the adders 91 through 94 respectively where the product signals are added to the feedback signal of the shift registers 95 through 98. Similarly, the product output signals of the multipliers 99 through 102 are provided to the adders 91 through 94 respectively where the product signals are added to the feedback signals of the shift registers 107 through 110. The sum of the product and feedback signals provided to the adders 91 and 94 are then stored in the first word storage of the shift registers 95 through 98 while the sum of the product and feedback signals provided to the adders 103 and 106 are then stored in the first word storage of shift registers 107 through 110. The shift registers 95 through 98 and 107 through 110 provide an output from their last digital word storage when first word storage is written into such that the last digital word of each shift register provides the feedback signal to the respective adder as each new word is written into the shift register. As will be apparent to those skilled in the art, the consequence of adding the last word of the shift register to the word which is being written into the first word of the shift register is to average the information which is provided to the prefilter 32 from the offset generator 31. The sampling of the prefilter 32 is accomplished at a lower rate to more nearly match the information rate of the data provided to the memory 32 to the achievable azimuth resolution by a gating signal which is provided on line 117 by the synchronous clock 28. The gating signal is simultaneously applied to the shift registers 95 through 98 to provide the averaged, in-phase and quadrature components of the sum signal on the lines 111 and 112 to the null tracker 34 and the memory 38. Also, the gating signal is simultaneously applied to the shift registers 107 through 110 to provide the averaged, in-phase and quadrature components of the difference signal on the lines 114 and 116 to the null tracker 34.

The in-phase and quadrature components of the sum and difference signals are provided by the prefilter 32 to the null tracker 34 which provides the in-phase and quadrature phase correction signals on lines 128, 130, 132 and 134 to the offset generator 31 to compensate for radial motion of the SAR system by the complex multiplication of the sum and difference signals by the phase correction signals as previously explained. In the null tracker 34, the divide ROM 118 provides an output which is the predetermined complex quotient and is selected as an output in accordance with the in-phase and quadrature values of the sum and difference signals provided by the prefilter 32.

It is well known to those skilled in the art of monopulse radar antennas that the quadrature component of the quotient of the complex division of the monopulse difference signal by the monopulse sum signal is equivalent to the tangential function of the angle from the monopulse null. This can be expressed mathematically as:

$$\frac{\Delta}{\Sigma} = j \tan \theta \qquad (2)$$

where $\Delta$ is the monopulse difference signal, $\Sigma$ is the monopulse sum signal; $j$ represents the quadrature component; and $\theta$ is the angle from the monopulse null. Therefore, the quadrature component of the complex division performed by the divide ROM 118 represents the tangent of the angle between the synthetic beam segment of the prefilter 32 and the stabilized null of the monopulse antenna 22.

The complex quotient is provided by the divide ROM 118 to the adder 120 which cooperates with the time delay 122 and the reset counter 124 to integrate the pointing error associated with the in-phase and quadrature components of the sum and difference signals provided by the prefilter 32. Initially, the delay line 122 and reset counter 124 contain a value which is equal to the value counted by the reset counter 124 during the time delay ($\tau$). This may be accomplished by initialization techniques familiar to those skilled in the art, such as a signal from the synchronous clock 28 (FIG. 2). The output quotient of the divide ROM 118 is provided to the adder 120 over an integration period determined by the delay time ($\tau$) of the delay line 122 after which the delay line 122 provides an output to the reset counter 124. The output of the delay line 122 to the reset counter 124 causes the reset counter 124 to begin counting down the value provided from the delay line 122 and also to provide as residue signal to the sin/cos ROM 126 and the adder 120. The residue signal is the deviation between the previous value provided to the reset counter 124 from the value counted by the reset counter 124 during the delay time. The residue signal is provided to the adder 120 to cause the adder 120 to provide the sum of the quotient signals received from the divide ROM 118 over the integration period $\tau$ to the delay line 122. After a subsequent time delay $\tau$, this value will be provided to the reset counter 124 causing the reset counter 124 to provide a residue signal which represents the deviation of the previous value received from the time delay 122 from the value counted by the reset counter 124 during the delay time. The count rate of the reset counter 124 is such that for the time delay $\tau$, the value of the residual signal will be zero if the value provided to the delay line 122 by the adder 120 is equivalent to the sum of the Δ/Σ quotients provided by the divide ROM 118 over the delay time where the pointing error angle is zero. However, if the value provided to the delay line 122 by the adder 120 represents the sum of the quotients provided by the diode ROM 118 over the delay time where there is an angle between the monopulse null and the directional vector of the synthetic beam segment of the prefilter, the reset counter 124 will provide a residue signal whose sign and magnitude are dependent upon the direction and magnitude of the pointing error angle determined for the integration period of the delay time.

The residue signal provided by the reset counter 124 to the sin/cos ROM 126, produces in-phase and quadrature phase correction signals on the lines 128 and 130 respectively. In accordance with the previously described operation of the divide ROM 118, the adder 120, the delay line 122, and the reset counter 124, the reset counter 124 provides a residue signal to the sin/cos ROM 126 which is equivalent to the integral of the tangential function of angle between the direction of the monopulse antenna null and the average center frequency of the prefilter 32 over the time period $\tau$. Therefore, the sin/cos ROM 126 provides the inphase and quadrature phase correction signals by providing at its output the phase angle whose tangential function is substantially equal to the value of the residue signal provided by the reset counter 124 scaled by a factor of $1/\tau$.

Referring now to FIG. 5, the disclosed invention also involves a method for controlling the resolution achievable with the disclosed SAR system. The antenna angular scan rate controls the FM slope of the information of the prefilter 32 and, therefore, controls the resolution achievable by the SAR system. As with the above-described technique for compensating radial platform motion of the SAR system, the method and apparatus for controlling the SAR resolution is also applicable with scanning or spotlight modes in which case the stabilized antenna is commanded to rotate at a selected angular rate to produce angular scanning or spotlight tracking of a given area.

FIG. 5 illustrates that the net effect of doppler tracking of the monopulse null under conditions where the antenna has an angular scan rate is to modify the frequency modulation slope of the doppler frequency. More specifically, FIG. 5 illustrates the doppler frequency histories of four antenna pattern reflectors $T_1$, $T_2$, $T_3$ and $T_4$ as a function of time for a particular case in which the antenna squint angle, that is, the angle between the antenna line-of-sight and the velocity vector of the antenna reference frame, is constant and for a particular case in which the antenna is scanned at a constant rate $\dot{\theta}$. When the antenna squint angle is constant, the doppler frequency history of the four targets $T_1$ through $T_4$ is indicated in waveform 5-A by the lines $H_1$ through $H_4$ respectively. Portions of these doppler histories $H_1$ through $H_4$ are reproduced in the waveform 5-B for the bandwidth 2F which is centered at zero doppler frequency.

The zero doppler curve when the antenna is scanned at a constant angular rate $\dot{\theta}$ is indicated by the dashed line $H_{\dot{\theta}}$. The points $I_1$ through $I_4$ indicate the zero doppler frequency coincidence of the doppler histories $H_1$ through $H_4$ for the constant angular scan rate $H_\theta$. The doppler histories for the angular scan rate condition are also reproduced as the dashed lines in waveform 5-B for the bandwidth 2F which is centered at zero doppler frequency. By an examination of waveform 5-A representing the doppler histories and waveform 5-B representing the doppler histories over a predetermined bandpass, it will be observed that the effect of scanning the antenna at an angular rate is that the frequency modulation slope (df/dt) of the doppler histories is made considerably lower than for the case in which the antenna squint angle remains constant.

If the antenna is commanded to an angular scan rate that is equal to the line-of-sight rate of a selected ground area resulting from platform translational motion, the antenna will, in effect, track the selected ground area. Under these conditions, the null tracker 44 would offset the doppler spectrum of the echo signal from the null region to zero doppler with the net effect of flattening the frequency modulation slope of the doppler frequency. Similarly, if the antenna were commanded to scan over a ground area at a known rate, the null tracking function would complement the angular scan rate by introducing a compensating frequency modulation rate to the doppler frequencies of echo signals. The null tracking function employed in conjunction with a commanded antenna angular rate consequently can be used to modify the doppler frequency modulation slope. Therefore, the variable frequency modulation slope, operating in conjunction with a predetermined bandwidth of the prefilter 32, provides a basis for varying the resolution achievable by the SAR focusing network 48 by controlling the angular scan rate of the monopulse antenna 22. Specifically, a fast scan rate will limit a resolution to a relatively coarse level while a comparatively slower scan rate will permit finer resolution.

The method of varying the frequency modulation slope (FM slope) by scanning the monopulse antenna 22 which operates in conjunction with the monopulse null tracker 34 as illustrated in FIG. 5 may also be described mathematically. The doppler frequency resulting from the combination of the SAR platform motion relative to the map strip 16 (FIG. 1) and the doppler frequency introduced by the angular scanning of the monopulse antenna 30 is expressed as follows:

$$f = 2V/\lambda \, [\cos \theta_t - \cos \theta_s] \qquad (3)$$

where $\lambda$ is the wavelength of the microwave antenna signal, V is the velocity of the SAR platform in free space, $\theta_t$ is the angle between the velocity vector of the SAR platform and the line-of-sight to the target, and $\theta_s$ is the angle between the velocity vector of the SAR platform and the monopulse antenna pattern null. The FM slope of the doppler frequency is obtained by taking the time derivative of the doppler frequency expressed by equation (3) and is as follows:

$$\frac{df}{dt} = \frac{2V}{\lambda} \sin \theta \, [\frac{V}{r} \sin \theta + \dot{\theta}_s] \qquad (4)$$

where V is the platform velocity, $\theta$ is the azimuth angle of the target, r is the range to the target, $\lambda$ is the wavelength of the microwave antenna signal, and $\dot{\theta}_s$ is the antenna angular scan rate. From equation (4) it will be seen that a variation in the antenna angular scan rate $\dot{\theta}_s$ will cause the FM slope of the doppler frequency to change.

The manner in which the variable FM slope interacts with the bandwidth of the prefilter 32 to limit the resolution achievable by the SAR system is also suggested in FIG. 5. The bandwidth limits (+F and −F) of the prefilter 32 limit the time that an echo signal from a particular point of reflection can be obtained at the prefilter output according to the inequality:

$$T_i < \frac{\beta_f}{df/dt} \quad (5)$$

where $T_i$ is the observation time for the echo signal from a particular reflection point, $\beta_f$ is the bandwidth of the prefilter, and $df/dt$ is the FM slope of the doppler frequency. The angular resolution which is achievable for the observation of a signal over a given time period is expressed by:

$$\theta_r = \frac{\lambda}{2VT_i \sin\theta} \quad (6)$$

where $\theta_r$ is the achievable angular resolution. According to the relation between the observation time of a target signal and the achievable angular resolution expressed by equations (5) and (6), the angular resolution achievable by the SAR system may be expressed by:

$$\frac{\left|\frac{V}{r}\sin\theta + \dot{\theta}_s\right|}{\beta_f} < \theta_r \quad (7)$$

From equation (7), it can be seen that, given a particular bandwidth $\beta_f$ of the prefilter 32, the achievable resolution can be controlled solely by an appropriate selection of the antenna angular scan rate $\dot{\theta}_s$. Accordingly, the disclosed monopulse motion compensation method also admits to a flexible SAR system in that is is compatible with the strip map, spotlight, or scanning operation modes whose resolution or area coverage are variable by the experience of controlling the antenna scan rate.

Additionally, the disclosed method for motion compensation of a SAR platform provides a basis for measuring the parameters for implementing the SAR focusing process in which the doppler frequency from the rate stabilized monopulse antenna is used to obtain the tangential velocity component to control the SAR focusing process. As is well known in the art, the limitations of SAR focusing derive from the accuracy with which the FM slope of the doppler frequencies of stored echo returns can be matched in a matched filtering process that is illustrated in FIG. 2 by the multiplier 40 and the correlator 45. Specifically, the tolerance on the FM slope of a matched filter necessary to preclude loss of focus is:

$$\Delta \frac{df}{dt} < \frac{8V^2\theta_r^2\sin^2\theta}{\lambda_2} \text{ (Hz/sec)} \quad (8)$$

where $\Delta df/dt$ is the permissible slope error, V is the platform velocity, $\theta$ is the squint angle of the antenna, $\lambda$ is the wavelength of the microwave antenna signal, and $\theta_r$ is the angular resolution. Equation (8) can be shown to be equivalent to:

$$\frac{df}{dt} < \frac{2}{r\lambda} V_t^2 + \frac{2\dot{\theta}_s}{\lambda} V_t \quad (9)$$

where r is the range to the antenna pattern reflector, and $V_t$ is the tangential component of velocity, that is, the velocity component of platform motion that is tangential to the line-of-sight of the antenna pattern. Equation (9) indicates that an accurate match filtering process requires and accurate knowledge of range to the echo reflector (r), microwave wavelength ($\lambda$), tangential velocity ($V_t$) and antenna scan rate ($\dot{\theta}_s$).

Recalling that the FM slope of the doppler frequency was expressed in equation (4) as:

$$\frac{df}{dt} = \frac{2V}{\lambda}\sin\theta \left[\frac{V}{r}\sin\theta + \dot{\theta}_s\right] \quad (4)$$

and observing that for the tangential velocity ($V_t$) may be expressed as:
$$V_t = V \sin\theta \quad (10)$$
equation (10) may be substituted into equation (4) to provide:

$$\frac{df}{dt} = \frac{2V_t}{\lambda}\left[\frac{V_t}{r} + \dot{\theta}\right] \quad (11)$$

from which the FM slope of the doppler frequency may be obtained. In the preferred embodiment of the disclosed SAR system, the range, angular scan rate, wavelength, and tangential velocity are provided in such a manner that the correct matched filter can be implemented without inputs from external systems. The range is provided by appropriate range gating functions of the range processor, the wavelength is provided by the transmitter 21, the angular scan rate is provided by a rate gyro mounted on the antenna, and tangential velocity can be provided by the tangential velocity signal generator 43 (FIG. 2) operating on the radial motion compensated monopulse signals of the offset generator 30 as is more particularly described herein.

The manner in which the tangential velocity is obtained by the tangential velocity signal generator 43 derives from the manner in which the incremental doppler frequency varies as a function of incremental change of antenna squint angle. Specifically, the monopulse antenna, to a first order approximation, weights the input doppler spectrum in direct proportion to the amplitude of the antenna pattern as a function of phase angle. That is, because of the direct relationship between antenna phase angle and doppler frequency, the amplitude of the backscattered doppler signal reflects the antenna pattern. This relationship is illustrated in FIG. 6 and is expressed more precisely as follows:

$$f_d = \frac{2V}{\lambda}\cos\theta \quad (12)$$

where $f_d$ is the doppler frequency.

Taking the derivative of equation (12), it can be shown that, for small angles of $\theta_s$:

$$\frac{df_d}{dt} = \frac{2V_t(d\theta/dt)}{\lambda} \quad (13)$$

where $V_t$ is the tangential component of velocity. Rewriting equation (13), it can be shown that:

$$V_t = \frac{\lambda \Delta f_d}{2\theta_c} \quad (14)$$

where $\Delta f_d$ is substituted for $df_d/dt$ and $\theta_c$, which represents the cross-over angle in the monopulse antenna pattern, has been substituted for $d\theta/dt$. The expression of equation (14) indicates that tangential velocity can be measured by the echo signals collected by the monopulse antenna 22 when the doppler frequency of the echo signals due to radial platform motion is compensated for by the offset generator 31 if the doppler shift between the monopulse null 54 (FIG. 6) and the cross-over angle ($\theta_c$) is known. The doppler shift between the monopulse null and the cross-over angle can be measured by bandpass filters which are offset for two synthetic beams displaced by angles $\theta_c$ from the monopulse null. The cross-over angle of the monopulse antenna pattern $\theta_c$ is known if defined in terms of a precalibrated, difference-over-sum ($\Delta/\Sigma$) antenna pattern cross-over point. From equation (14), it can be seen that, given a capability to measure $\Delta f_d$ at a predetermined difference-over-sum, the capability is provided for measuring tangential velocity ($V_t$).

FIG. 7 is a more detailed block diagram of the tangential velocity signal generator 43 and the focusing network 42 shown in FIG. 2. In the more detailed drawing of FIG. 7, the in-phase and quadrature components of the sum signal provided by the adders 80 and 82 respectively (FIG. 4) are supplied to the tangential velocity signal generator 43 on the lines 200 and 202. Likewise, the in-phase and quadrature components of the difference signal provided by the adders 84 and 86 respectively are supplied to the tangential velocity signal generator 43 on the lines 204 and 206. The tangential velocity signal generator 43 includes mixers 208 and 210 which are responsive to the inphase component of the sum signal; mixers 212 and 214 which are responsive to the quadrature component of the sum signal; mixers 216 and 218 which are responsive to the in-phase component of the difference signal; and mixers 220 and 222 which are responsive to the quadrature component of the difference signal. The tangential velocity signal generator 43 further includes an adder 224 that is responsive to the mixing products of the mixers 210 and 214; and adder 226 that is responsive to the mixing products of the mixers 208 and 212; and adder 228 that is responsive to the mixing products of the mixers 218 and 222; and an adder 230 that is responsive to the mixing products of the mixers 216 and 220. The adders 224 and 226, respectively, provide the in-phase and quadrature components of the sum signal to a digital filter 232, and the adders 228 and 230 respectively provide the in-phase and quadrature components of the difference signal to the digital filter 232.

The digital filter 232 operates to track the doppler frequency $\Delta fd$ of the sum and difference signals of the monopulse antenna at the cross-over angle of the monopulse antenna pattern as is hereafter more fully explained. The in-phase and quadrature components of the sum signal are provided by the digital filter 232 on lines 234 and 236 to an amplitude detector 238 which determines the absolute value of the amplitude of the sum signal. The in-phase and quadrature components of the difference signal are provided by the digital filter 232 on lines 240 and 242 to an amplitude detector 244 which determines the absolute value of the amplitude of the difference signal. The absolute values of the sum and difference signals are provided by the amplitude detectors 238 and 244 respectively to an adder 246 which determines the difference of the absolute values of the sum and difference signals. The tangential velocity signal generator 43 further includes an adder 248, a delay line 250 and a reset counter 252 which cooperate to perform an integration function on the output of the adder 246, and a sin/cos read-only memory 254 (hereafter sometimes referred to as sin/cos ROM 254) for providing the value of the arc-tangent function of the output of the reset counter 252 to the mixers 208 through 222.

In the operation of the tangential velocity signal generator 43, to the tangential velocity $V_t$ of the SAR radar platform, the in-phase and quadrature components of the sum signal are provided to the tangential velocity signal generator 43 on the lines 200 and 202 and the in-phase and quadrature components of the difference signal are provided to the tangential velocity signal generator 43 on the lines 204 and 206 from the offset generator 31 (FIG. 2).

It will be seen that the mixers 208, 210, 212 and 214 and the adders 224 and 226 cooperate to provide in-phase and quadrature components of the product of the sum signal and the cross-over offset signal provided by the sin/cos ROM 254 as will be presently described. More specifically, the mixer 208 is responsive to the in-phase sum signal on line 200 and the quadrature component of the cross-over offset signal on line 262; the mixer 210 is responsive to the in-phase sum signal on line 200 and the in-phase component of the cross-over offset signal on line 260; the mixer 212 is responsive to the quadrature sum signal on line 202 and the in-phase component of the cross-over offset signal on line 260; and the mixer 214 is responsive to the quadrature sum signal on line 202 and the quadrature component of the cross-over offset on line 262. The mixing products of the mixer 210 and the mixer 214 are added in the adder 224 to provide the in-phase component of the complex product of the in-phase and quadrature components of the sum signal and the in-phase and quadrature components of the cross-over offset signal. Similarly, the mixing products of the mixer 212 are subtracted from the mixing products of the mixer 208 in the adder 226 to provide the quadrature component of the complex product of the in-phase and quadrature components of the sum signal and the in-phase and quadrature components of the cross-over offset signal.

In a manner analogous to that described for the mixers 208, 210, 212 and 214 and the adders 224 and 226, the mixers 216, 218, 220 and 222 and the adders 228 and 230 cooperate to provide the in-phase and quadrature components of the complex product of the difference signal and the cross-over offset signal. More specifically, the mixer 216 is responsive to the in-phase difference signal on line 204 and the quadrature component of the cross-over offset signal on line 262; the mixer 218 is responsive to the in-phase difference signal on line 204 and the in-phase component of the cross-over offset signal on line 260, the mixer 220 is responsive to the quadrature difference signal on line 206 and the in-phase component of the cross-over offset signal on line 260; and the mixer 222 is responsive to the quadrature difference signal on line 206 and the quadrature component of the cross-over offset signal on line 262. The mixing products of the mixer 218 and the mixer 222 are added in the adder 228 to provide the in-phase component of the complex product of the in-phase and quadrature components of the difference signal and the in-phase and quadrature components of the cross-over offset signal. Similarly, the mixing products of the mixer 220 are subtracted from the mixing products of the mixer 216 in the adder 230 to provide the quadrature component of the complex product of the in-phase and quadrature components of the difference signal and the in-phase and quadrature components of the cross-over offset signal.

As previously explained in relation to FIGS. 3 and 4, the phase correction signal provided by the null tracker 34 compensates for the phase induced in the sum and difference signals provided by the A/D converter 30 to the offset generator 31 by the radial velocity of the SAR platform. Consequently, the quotient of the difference signal over the sum signal which identifies the antenna pattern null 54 of the antenna 22 corresponds to zero doppler frequency in the sum and difference signals of the offset generator 31 which are provided to the tangential velocity signal generator 43 on lines 200 through 206.

In a manner similar to the cooperation of the offset generator 31 and the null tracker 34, the complex multiplication of the null stabilized sum and difference signals provided by the offset generator 31 with the cross-over offset signal provided by the sin/cos ROM 254 will again shift the phase of the sum and difference signals such that they correspond to the doppler frequency of the antenna cross-over angle.

As was discussed in relation to FIG. 6, the doppler shift $\Delta f_d$ in received signals is weighted by the phase shift which occurs across the face of the antenna 22. Therefore, the complex multiplication of the null stabilized sum and difference signals will weight the zero doppler shift of the null stabilized sum and difference signals by the doppler shift $\Delta f_d$ in received signals which occuurs at the correlation angle $\theta_c$, provided the phase of the cross-over offset signal, relative to the sum and difference signals is substantially equal to the phase shift which occurs in the antenna pattern over the correlation angle $\theta_c$. That is, if the phase shift of the cross-over offset signal, relative to the sum and difference signals tracks the phase shift corresponding to the correlation angle $\theta_c$ of the antenna pattern, the doppler frequency of the product of the cross-over signal with the sum and difference signals will track the doppler frequency of the correlation angle. As was also illustrated in FIG. 6, the cross-over angle $\theta_c$ identifies the angle of the antenna pattern at which the amplitude of the sum signal equals the amplitude of the difference signal. Accordingly, the apparatus of FIG. 7 which includes the amplitude detectors 238 and 244, the adders 246 and 248, the delay line 250, and the reset counter 252, cooperate to cause the digital filter 232 to track the doppler frequency $\Delta f_d$ at the correlation angle $\theta_c$ of the antenna pattern by detecting a zero amplitude difference between the sum and difference signals.

The sum signal included in the mixing products of the adders 224 and 226 is filtered from the other mixing products of the sum signal of the offset generator 31 and the cross-over offset signal by the digital filter 232 and provided to the amplitude detector 238 on lines 234 and 236. The difference signal included in the mixing products of the adders 228 and 230 is similarly filtered from the other mixing products of the difference signal of the offset generator 31 and the cross-over offset signal by the digital filter 232 and provided to the amplitude detector 244 on lines 240 and 242. The absolute value of the difference signal that is detected by the detector 244 is subtracted from the absolute value of the sum signal that is detected by the detector 238 in the adder 246 and this difference is provided to the adder 248. Since definition, the absolute value of the sum signal equals the absolute value of the difference signal, the difference of the inputs to the adder 246 will be zero when the digital filter 232 is tracking the doppler frequency and the cross-over angle. Moreover, if the difference of the inputs to the adder 246 is positive, the sum signal is greater than the difference signal and, as will be seen in connection with the illustration of FIG. 6, the digital filter 232 is tracking the doppler frequency at a point between the monopulse null and the cross-over angle. Conversely, if the difference of the inputs to the adder 246 is negative, the difference signal is greater than the sum signal and, as will be seen in connection with the illustration of FIG. 6, the digital filter 232 is tracking the doppler frequency angle which exceeds the correlation angle. Consequently, the phase of the cross-over offset signal of the sin/cos ROM 254 is appropriately controlled to cause the digital filter 232 to track the doppler frequency at the cross-over angle $\theta_c$ of the monopulse antenna by controlling the phase of the output of the sin/cos ROM 254 in proportion to the arc tangent function of the output of the adder 246. That is, the sin/cos ROM 254 provides a cross-over reference signal whose phase corresponds to the arc tangent function of a radian angle of deviations from the cross-over angle $\theta_c$. This radian angle is determined from the difference signal of the adder in accordance with the predetermined monopulse antenna pattern as illustrated in FIG. 6. In accordance with the foregoing description, when the output of the adder 246 is zero, the digital filter 232 is tracking at the cross-over angle, and when the output of the adder 246 is positive or negative, the output of the adder 246 expresses the deviation from the cross-over angle at which the digital filter 232 is tracking. The output of the adder 246 is equated to an antenna angle by an analysis of the values of the remainder of the difference signal from the sum signal which are achieved at the angular coordinates of the predetermined antenna pattern. Therefore, sin/cos ROM 254 may be designed to provide the phase equivalent of the arc tangent function of the antenna angle to provide a cross-over reference signal of the appropriate phase directly from the remainder of the difference signal from the sum signal by equating the arc tangent function of the antenna angle with the difference signal associated with the same antenna angle. Accordingly, when the difference signal address of the sin/cos ROM 254 is addressed by the output of the adder 246, the sin/cos ROM 254 will produce the cross-over reference signal of the appropriate phase to cause the digital filter 232 to track the doppler frequency which coincides with the correlation angle $\theta_c$ of the antenna 22.

The output of the adder 246 is integrated over a time period $\tau$ by the adder 246, the delay line 250, and the reset counter 252 in a manner similar to the previously explained operation of the adder 120, the delay line 122, and the reset counter 124. The output of the adder 246 is provided to the adder 248 which cooperates with the time delay 250 and the reset counter 252 to integrate the error associated with sum and difference signals provided by the detectors 238 and 244 over the integration period. Initially, the delay line 250 and the reset counter 252 contain a value which is equal to the value counted by the reset counter 252 during the time delay ($\tau$). This may be accomplished by initialization techniques familiar to those skilled in the art, such as a signal from the synchronous clock 28. The output signal of the adder 246 is provided to the adder 248 over an integration period determined by the delay time ($\tau$) of the delay line 250 after which the delay line 250 provides an output to the reset counter 252. The output of the delay line 250 to the reset counter 252 causes the reset counter 252 to begin counting down the value provided from the delay line 250 and also to provide a residue signal to the sin/cos ROM 254 and the adder 248. The residue signal is constituted by the deviation between the previous value provided to the reset counter 252 from the value counted by the reset counter 252 during the delay time ($\tau$). The residue signal is provided to the adder 248 to cause the adder 248 to provide the output signal of the adder 246 received over the integration period $\tau$ to the delay line 250.

After a subsequent time delay $\tau$, this value will be provided to the reset counter 252 causing the reset counter 252 to provide a residue signal which represents the deviation between the previous value received from the time delay 250 and the value counted by the reset counter 252 during the delay time. The count rate of the reset counter 252 is such that for the time delay $\tau$, the value of the residue signal will be the value which represents the cross-over angle $\theta_c$ in the sin/cos ROM 254 if the value provided to the delay line 250 by the adder 248 is zero over the delay time. However, if the value provided to the delay line 250 by the adder 248 represents the sum of the outputs provided by the adder 246 over the delay time where there is an angle between the cross-over angle $\theta_c$ and the angle of the sum and difference signals provided to the digital filter 232, the reset counter 252 will provide a residue-signal whose magnitude is dependent upon the direction and magnitude of the deviation from the cross-over angle $\theta_c$ determined by the adder 246 for the integration period of the delay time $\tau$. As explained previously, the residue signal provided by the reset counter 252 to the sin/cos ROM 254, produces cross-over shift signals on the lines 260 and 262 respectively. In accordance with the previously described operation of the adder 246, the adder 248, the delay line 250, and the reset counter 252, the reset counter 252 provides a residue signal to the sin/cos ROM 254 which is equivalent to the angle between the monopulse antenna null and the average center frequency of the cross-over angle over the time period $\tau$. Therefore, the sin/cos ROM 254 provides the in-phase and quadrature cross-over shift signals by providing at its output the phase angle whose tangential function is substantially equal to the antenna angle associated with the residue signal provided by the reset counter 252 scaled by a factor of $1/\tau$.

The counter 256 is responsive to the output of the reset counter 252 to provide the doppler frequency at the cross-over angle $\theta_c$ of the antenna pattern. More specifically, each time the delay line 250 provides an output to the reset counter 252 causing the reset counter 252 to provide a residue signal to the sin/cos ROM 254, the residue signal is also provided to the counter 256. The counter 256 operates to factor the residue signal by an amount which is substantially equal to $\lambda 2\theta_c$ where the RF wavelength $\lambda$ and the cross-over angle $\theta_c$ are constant for the monopulse antenna. As was previously described in relation to the equations (12), (13) and (14), the doppler frequency is weighted as a function of the antenna angle. Therefore, the counter 256 is calibrated to provide a known tangential velocity ($V_t$) in response to the output of the reset counter 252 that is substantially equivalent to the number of counts that are made during the time delay ($\tau$). That is, the counter 256 is calibrated to provide a known tangential velocity $V_t$ in response to a steady state output of the reset counter 252 that indicates that the digital filter 232 is tracking the doppler frequency of the received signal at the cross-over angle $\theta_c$. The output of the counter 256 is weighted in accordance with the relationship between the output of the adder 246 and the angle of the monopulse antenna as was previously described in relation to the cooperation of the adder 246 and the sin/cos ROM 254.

When the counter 256 has been calibrated to the reset counter 252 and the output of the counter 256 is weighted in accordance with the angle of the monopulse antenna as a function of the remainder between the sum and difference signals, the counter 256 will integrate the sign and magnitude of the residue signal of the reset counter 252 over the operation time of the tangential velocity signal generator 43 to provide the tangential velocity of the radar platform as a function of the doppler frequency of signals received at the cross-over angle of the monopulse antenna pattern. That is, after the termination of an initial transient period during which the sum and difference signals provided to the digital filter 232 would be phase shifted from the monopulse null of the antenna to the cross-over angle, the counter 256 would cumulatively add the residue signal of the reset counter 252 provided for each delay time $\tau$ so that, after the termination of an initial transient period during which the sum and difference signals provided to the digital filter 232 would be shifted from the monopulse null of the antenna to the cross-over angle, the counter 256 provides the tangential velocity of the radar platform in accordance with the equation (14) by multiplying the doppler frequency $\Delta f_d$ at the cross-over angle $\theta_c$ by a factor of $\lambda/2\theta_c$.

FIG. 7 also shows in greater detail the focusing network 42 of FIG. 2. The focusing network 42 shown in FIG. 7 includes a divider 258 and a multiplier 260 which are responsive to the tangential velocity signal of the tangential velocity signal generator 43; a divider 262 which is responsive to the multiplier 260; an adder 264 which is responsive to the divider 258; and a multiplier 266 which is responsive to the divider 262 and the multiplier 264. In the operation of the focusing network 43, the tangential velocity ($V_t$) is multiplied by two in the multiplier 260 to provide an output of ($2V_t$). The output of the multiplier 260 is provided to the divider 262 which divides the $2V_t$ output of the multiplier 260 by a constant which is substantially equal to the wavelength ($\lambda$) of the RF energy of the antenna pattern to provide an output of $2V_t/\lambda$. The tangential velocity ($V_t$) provided by the tangential velocity signal generator 43 is also provided to the divider 258 in which the tangential velocity is divided by the range to the resolution cell 16 which is being focused for correlation by the correlator 45 to provide an output of $V_t/r$. In the preferred embodiment, the range (r) is provided on line 268 by the synchronous clock 28 which simultaneously addresses the information stored in the azimuth addresses of the memory 38 for the same range as is indicated in FIG. 2. The adder 264 adds the $V_t/r$ output of the divider 258 to the angular velocity $\dot{\theta}$ of the antenna 22 to provide an output of $[V_t/r + \dot{\theta}]$. The angular velocity $\iota$ of the antenna 22 is provided by the antenna scan rate control 44 of FIG. 2. The antenna scan rate control 44 may be comprised of antenna rate gyros as is well known in the art and the angular rate ($\dot{\theta}$) of the antenna 22 may be determined from the command signal provided to such rate gyros as is shown in FIG. 7. The output of the divider 262 is multiplied by the output of the adder 264 in the multiplier 266 to provide an output signal which is substantially equal to $$\frac{2V_t}{\lambda}[\frac{V_t}{r} + \dot\theta].$$

In accordance with equation (11), the multiplier 266, therefore provides the FM slope of the doppler frequency which comprises the focusing signal of the focusing network 42.

As has been described in accordance with FIGS. 1 through 7, the disclosed method and apparatus provide compensation for the radial motion of the SAR platform relative to echo reflectors through the tracking of the monopulse antenna pattern null; control of the resolution achievable by the SAR system through control of the scan rate of the monopulse antenna; and focusing of the information accumulated by the SAR system in response to the angular scan rate of the monopulse antenna and the tangential velocity of the SAR platform.

I claim:

1. Apparatus for compensating for the radial motion of a synthetic aperture radar which correlates the echo returns of a microwave signal propagated from a stabilized monopulse antenna to form an image of the reflecting surface, said apparatus comprising:

an offset generator for compensating for the phase shift in the echo returns caused by the doppler frequency imposed on the return signals by the radial motion of said synthetic aperture radar;

a prefilter for averaging the phase of a predetermined number of the echo returns contained within a given frequency bandwidth to provide prefilter beam segments; and means for tracking the amplitude of the echo return signals in relation to the amplitude of the echo return signals at a predetermined angle of the monopulse antenna to provide a phase correction signal in relation to the angle between the direction of the prefilter beam segments and the direction of the predetermined value of the echo return signals to said offset generator for the correction of said phase errors.

2. The apparatus of claim 1 further comprising:

a rate stabilized monopulse antenna for providing received signals in a difference channel and also for providing received signals in a sum channel.

3. The apparatus of claim 2 in which the predetermined value of the return signal which is tracked by said tracking means is the difference-over-sum value of the null position of the monopulse antenna.

4. A synthetic aperture radar that focuses the echo signals from a signal reflector to form an image, said synthetic aperture radar comprising:

an offset generator for translating the doppler frequency of the echo signals at the null position of said antenna to a substantially zero doppler frequency in response to a monopulse null reference signal;

a prefilter for limiting the bandwidth of the output of said offset generator to substantially match the azimuth resolution of said synthetic aperture radar;

a monopulse null tracker for providing said monopulse null reference signal to said offset generator in response to the output of said prefilter;

a tangential velocity signal generator for determining the tangential velocity of the synthetic aperture radar in response to the frequency translated output of the offset generator; and means for focusing the bandwidth limited output of said prefilter in response to the tangential velocity determined by said tangential velocity measurement generator.

5. A synthetic aperture radar system operative with a stabilized monopulse antenna, to provide a focused image from echo signals returned from a signal reflector, said radar system comprising:

an offset generator which compensates for radial motion of the synthetic aperture radar platform by translating the doppler frequency of the echo signals at the null position of said antenna to a substantially zero doppler frequency in response to a monopulse null reference signal;

a prefilter for limiting the bandwidth of the motion compensated output of said offset generator to substantially match the sampling frequency of the echo signals to the azimuth resolution of the synthetic aperture radar;

a monopulse null tracker which tracks the null position of the monopulse antenna to provide the monopulse null reference signal for said offset generator;

a tangential velocity signal generator for determining the tangential velocity of the synthetic aperture radar platform in response to the motion compensated doppler frequency at the cross-over angle of the monopulse antenna; and means for focusing the bandwidth limited output of said prefilter in response to said tangential velocity signal generator and the angular rate of said monopulse antenna.

6. The apparatus of claim 5 in which said tangential velocity signal generator includes:

a multiplier for multiplying the motion compensated, bandwidth limited output of said prefilter by a cross-over translation signal to reference the prefilter output to the cross-over angle of the monopulse antenna;

a digital filter for determining the frequency of the output of said multiplier;

means for controlling the cross-over translation signal to said multiplier in response to the cross-over angle of said monopulse antenna; and means for generating the tangential velocity in response to the doppler frequency of said digital filter.

7. The apparatus of claim 6 wherein said control means determines the cross-over angle of the monopulse antenna in response to the remainder of the difference signal of said digital filter from the sum signal of said digital filter.

8. The apparatus of claim 6 wherein said generating means generates the tangential velocity of the synthetic aperture radar platform in accordance with the relation:

$$V_t = \frac{\Delta f_d \lambda}{2\theta_c}$$

where:

$\Delta f_d$ is the doppler frequency of the motion compensated output of said prefilter at the cross-over angle of said monopulse antenna;

λ is the wavelength of the microwave energy propagated from the monopulse antenna; and $\theta_c$ is the cross-over angle of the monopulse antenna.

9. The apparatus of claim 5 wherein said focusing means focuses the bandwidth limited output of the prefilter in accordance with the relation:

$$\frac{df_d}{dt} = \frac{2V_t}{\lambda}[r\,V_t + \dot{\theta}_c]$$

in which:

$V_t$ is the tangential velocity of the synthetic aperture radar platform;

λ is the wavelength of the microwave energy which is propagated from the monpulse antenna;

r is the range of the signal reflector from the monopulse antenna; and $\dot{\theta}_c$ is the angular rate of the monopulse antenna.

10. A synthetic aperture radar that is responsive to sum and difference signals of a monopulse antenna to resolve an image of the antenna pattern reflector, said synthetic aperture radar comprising:

an offset generator for translating the doppler frequencies of the sum and difference signals corresponding to a selected angle of the antenna pattern to substantially zero doppler frequency in response to a monopulse null reference signal;

a prefilter that is responsive to the translated sum and difference signals offset generator, said prefilter limiting the bandwidth of the offset generator output to substantially match the azimuth resolution of said synthetic aperture radar; and a monopulse null tracker that is responsive to the sum and difference signals of the prefilter, said monopulse null tracker generating the monopulse null reference signal for the offset generator with respect to the quotient of the difference signal corresponding to a selected angle of the monopulse antenna pattern divided by the sum signal corresponding to substantially the same angle.

11. Apparatus for focusing the image of a synthetic aperture radar that is responsive to sum and difference signals of a monopulse antenna to resolve an image of the antenna pattern reflector, said apparatus comprising:

means for compensating for the radial motion of the monopulse antenna with respect to the reflector;

means for prefiltering the radial motion compensated output of said compensating means to provide prefilter beam segments; and means for focusing the prefilter beam segments of said prefiltering means in response to the tangential velocity and angular scan rate of the monopulse antenna, the wavelength of the antenna pattern, and the range to the reflector.

12. Apparatus for determining the tangential velocity of a stabilized monopulse antenna that provides sum and difference signals to a synthetic aperature radar to resolve an image of the antenna pattern reflector, said apparatus comprising:

means for compensating for the radial motion of the monopulse antenna to provide motion compensated sum and difference signals that correspond to a selected angle of the monopulse antenna pattern;

means for translating the doppler frequency of the motion compensated sum and difference signals to the cross-over angle of the monopulse antenna pattern, said translating means being responsive to the sum and difference signals of the compensating means to provide sum and difference signals corresponding to the cross-over angle of the antenna pattern; and means for determining the tangential velocity of the monopulse antenna with respect to the doppler frequency of the sum and difference signals corresponding to the cross-over angle, said determining means being responsive to the cross-over angle sum and difference signals of said translating means to provide a tangential velocity signal.

13. The apparatus of claim 12 wherein said velocity determining means multiplies the doppler frequency of the cross-over sum and difference signals by a factor of $\lambda/\theta_c$ where:

λ is the wavelength of microwave energy propagated from the monopulse antenna; and $\theta_c$ is the cross-over angle of the monopulse antenna.

14. A method for compensating for the radial motion of a synthetic aperture radar which correlates the echo returns of a microwave signal propagated from a stabilized monopulse antenna to form an image of the reflecting surface, said method comprising:

averaging the phase of a predetermined number of the echo returns contained within a given frequency bandwidth to provide prefilter beam segments;

tracking a predetermined amplitude of the echo return signals to determine the angle between the direction of the prefilter beam segments and the direction of the predetermined value of the echo return signals; and compensating for the phase shift in the echo returns caused by the doppler frequency imposed on the return signals by the radial motion of said synthetic aperture radar in response to the angle between the direction of the prefilter beam segments and the direction of the predetermined value of the echo return signals.

15. A method for controlling the resolution of a synthetic aperture radar which correlates the echo returns of a microwave signal propagated from a stabilized monopulse antenna to form an image of the reflecting surface, said method comprising:

averaging the phase of a predetermined number of the echo returns contained within a given time-bandwidth product to provide prefilter beam segments;

tracking a predetermined amplitude of the echo return signals to determine the angle between the direction of the prefilter beam segments and the direction of the predetermined value of the echo signal;

compensating for the phase shift in the echo returns cased by the doppler frequency imposed on the return signals by the radial motion of said synthetic aperture radar in response to the angle between the direction of the prefilter beam segments and the direction of the predetermined value of the echo return signals; and controlling the resolution of the synthetic aperture radar by controlling the time-bandwidth products from which the prefilter beam segments are provided.

16. A method for focusing the image of a synthetic aperture radar which correlates the echo returns of a microwave signal propagated from a stabilized monopulse antenna to form an image of the reflecting surface, said method comprising:

averaging the phase of a predetermined number of the echo returns contained within a given frequency bandwidth to provide prefilter beam segments;

tracking a predetermined amplitude of the echo return signals to determine the angle between the direction of the prefilter beam segments and the direction of the predetermined value of the echo return signals;

compensating for the phase shift in the echo returns caused by the doppler frequency imposed on the return signals by the radial motion of said synthetic aperture radar in response to the angle between the direction of the prefilter beam segments and the direction of the predetermined value of the echo return signals; and generating the tangential velocity of said synthetic aperture radar in response to the doppler frequency of the prefilter beam segments at a predetermined angle of the antenna pattern of the monopulse antenna.

* * * * *